United States Patent [19]

Pierson

[11] Patent Number: 4,708,798
[45] Date of Patent: Nov. 24, 1987

[54] ENDLESS BELT BATCH FILTRATION APPARATUS

[75] Inventor: Henri G. W. Pierson, Tenerife, Spain

[73] Assignee: D and C Ltd., Monrovia, Liberia

[21] Appl. No.: 859,830

[22] Filed: May 5, 1986

[30] Foreign Application Priority Data

May 9, 1985 [GB] United Kingdom ............... 8511761
Mar. 7, 1986 [GB] United Kingdom ............... 8605702

[51] Int. Cl.⁴ ...................... B01D 29/02; B01D 33/04
[52] U.S. Cl. ..................................... 210/385; 210/400
[58] Field of Search ............. 210/138, 141, 350, 351,
210/386, 400, 401, 406, 241, 385, 398, 399

[56] References Cited

U.S. PATENT DOCUMENTS 4,477,358 10/1984 Heintges et al. .................... 210/401

FOREIGN PATENT DOCUMENTS 0020101 12/1980 European Pat. Off. .......... 210/406
1149444 4/1969 United Kingdom ............... 210/386
2119669 11/1983 United Kingdom ............... 210/400

Primary Examiner—Richard V. Fisher
Assistant Examiner—Linda S. Evans
Attorney, Agent, or Firm—Dennison, Meserole, Pollack & Scheiner

[57] ABSTRACT

An endless filter belt is guided and supported by rollers or non-rotatable guide bars so as to have an upper run which extends above a substantially horizontal drainage plate to which a vacuum may be applied to draw liquid downwards therethrough. The upper run of the belt is shaped by movable guide means, e.g. pivotal arms which raise and lower the respective ends of the upper run and elements which depress a central region of the upper run into contact with the drainage plate, so as to form a receptacle into which a batch of material to be filtered can be placed. After filtration, when vacuum is no longer applied to the plate, the belt is progressed and any filter cake is removed at another location, a fresh section of belt then being available to form another receptacle.

11 Claims, 1 Drawing Figure

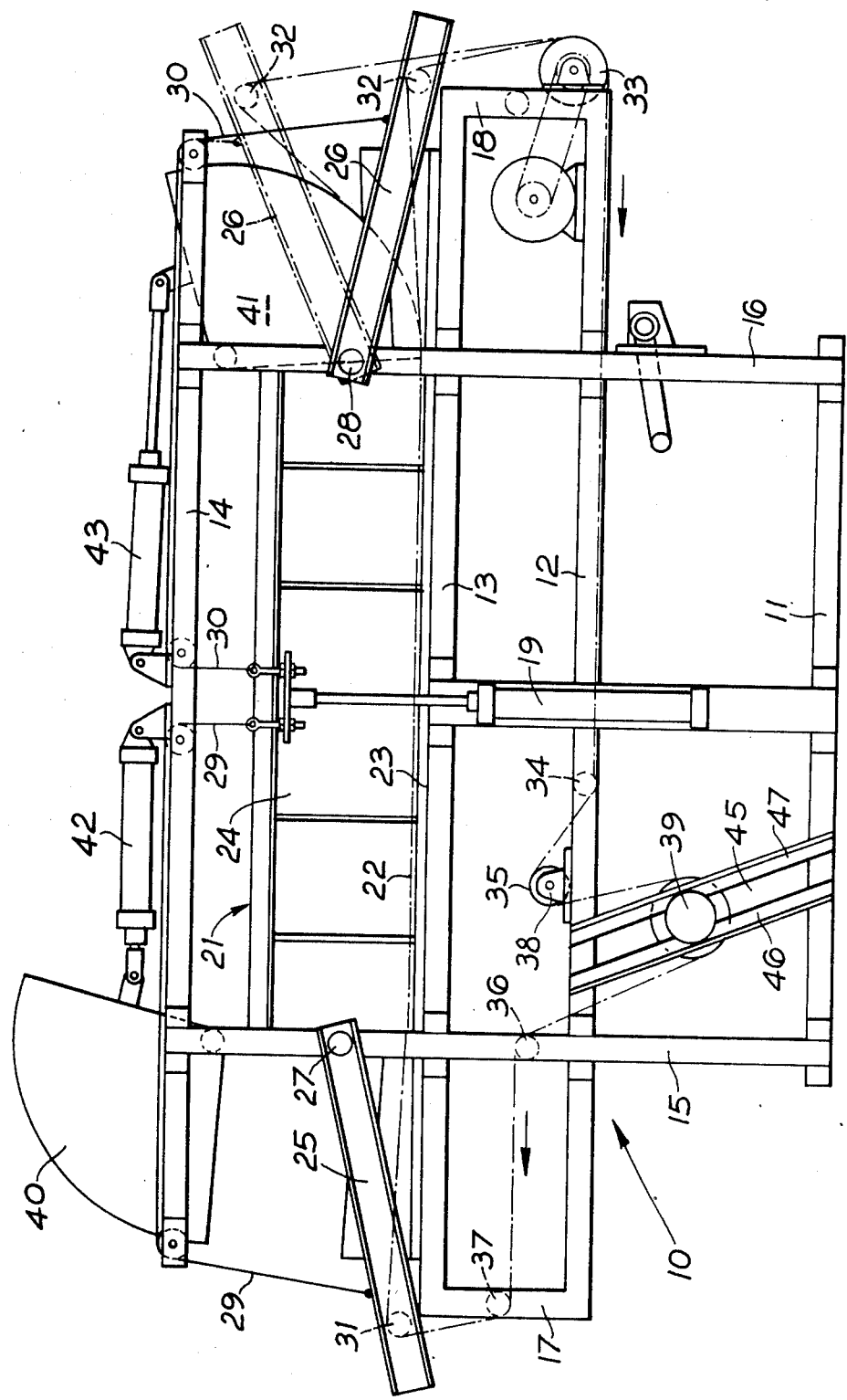

ENDLESS BELT BATCH FILTRATION APPARATUS

TECHNICAL FIELD

When separation of solids from liquids is required in industry, batch filtration is often the safest and most appropriate method to employ, for examples, in cases where various batches are of different nature such that continuous filtration on a moving filter belt is unsuitable, in cases where batch identity is important and each batch has to be treated separately, and in cases where batch size is too small to warrant continuous filtration.

BACKGROUND ART

In such cases, box filters or Nutsch filters are commonly used for batch filtration. Such filters typically comprise a receptacle in the form of a rectangular or circular drainage plate surrounded by vertical or inclined side walling. A filter medium, usually a filter cloth, lies inside this receptacle, which in use is usually connected downwardly to a vacuum source. A batch of material, e.g. slurry, to be filtered is placed into the receptacle and filtration takes place by drainage, usually assisted by vacuum, leaving a filter cake deposited on the filter medium. Frequently this process is followed by cake washing using a suitable wash liquor which drains away and/or is removed by vacuum in the same way.

A disadvantage of this method of batch filtration is the relatively large amount of labour involved in removal of the resulting filter cake by digging it out of the box filter receptable. Such digging also inevitably leads to spillage of some of the cake, which is often a valuable product, and to damage to the filter medium. A further disadvantage is the inability to clean the filter medium effectively between batches, e.g. by washing. Together with the damage to the filter medium caused by the digging out, this leads to a gradual deterioration of filtration rates.

It is an object of the invention to provide batch filtration apparatus which incorporates all the advantages of the stationary manual box or Nutsch filter but enables the cake to be discharged after filtration (and cake washing if appropriate) in a simple, rapid and non-damaging manner and allows the filter cloth to be washed effectively.

SUMMARY OF INVENTION

Pursuant hereto, the invention provides a batch filtration apparatus comprising a tray or similar support means to which vacuum can be applied, an endless filter belt guided and supported so as to have an upper run which is located above the tray or similar support means and which can be shaped by movable guide means so as to provide a receptacle for a batch of material to be filtered, and drive means operative to progress the filter belt when vacuum is not being applied to the tray or similar support means.

It will thus be appreciated that in accordance with the invention the 'box' or receptacle for holding the batch of material to be filtered is, at least in part, formed by the filter medium itself which is caused by various guide means (at least some of which are movable) to take up an appropriate shape. Moreover, the filter medium is provided as a section of an endless belt and this belt can be progressed by drive means once the filtration is complete so that the section of belt which formed the receptacle and on which the filter cake is deposited can be moved away from the underlying support means and the belt-shaping guide means to a location where removal of the cake can be accomplished in a simple manner, without the likelihood of damage to the filter medium, and where that belt section can be thoroughly washed.

The upper run of the belt extends between an upstream roller or non-rotatable guide bar and a downstream roller or non-rotatable guide bar and the movable belt-shaping guide means conveniently comprises one or more elements which act to depress the upper run of the belt between the upstream roller or bar and the downstream roller or bar into contact with a drainage surface of the tray or similar support means so as to form the upper run into a relatively large trough-shaped receptacle. The or each element is preferably movable out of contact with the filter belt when filtration is complete to facilitate movement of the belt and discharge of the filter cake.

Additionally, the movable guide means preferably comprise one or more members which act to raise the upstream and/or downstream rollers or bars during filtration and lower same during belt movement.

In a preferred embodiment of the apparatus there are two elements in the form of respective drums of part-circular cross section, one at each end of the upper run, which are pivotable between a lower position in contact with the filter belt where they provide a substantially vertical end wall of the receptacle, and an upper position out of contact with the filter belt. Also the upstream and downstream rollers or non-rotatable guide bars are each mounted on pivotal members, e.g. a pair of pivotal arms or a pivotal end wall of the tray, which are capable of swinging downwards substantially into line with the drainage surface of the tray or other support means when filtration is complete to facilitate movement of the belt and discharge of the filter cake.

The drive means conveniently comprises a driven roller in the lower run of the belt. A tensioning roller is preferably also provided in the lower run of the belt, particularly in the case where the upstream and/or downstream rollers or non-rotatable guide bars are mounted on pivotal members as just mentioned as it is then needed to take up slack when the pivotal members swing down and give up slack when the pivotal members return to their original position for further filtration operations.

BRIEF DESCRIPTION OF DRAWING

The invention will be described further, by way of example, with reference to the accompanying drawing, in which the single FIGURE is a schematic side elevation of a preferred practical embodiment of the filtration apparatus of the invention.

DETAILED DESCRIPTION OF ILLUSTRATED EMBODIMENT

As shown, the apparatus comprises a framework 10 which supports a vacuum tray 21 and a plurality of rollers 31 to 37 around which an endless belt 22 of filter cloth is guided and supported.

The framework 10 consists, at each side, of two main uprights 15, 16 supporting four substantially horizontal longitudinal beams 11 to 14. Subsidiary vertical struts 17, 18 are provided between the respective ends of the central beams 12. 13, which project beyond the ends of the uppermost and lowermost horizontal beams 14, 11. The main uprights 15, 16 are connected to each other by various cross-beams (not shown) to impart appropriate structural rigidity to the framework 10.

The vacuum tray 21, which is located just above the level of the beam 13, consists of a substantially rectangular perforated drainage plate 23 having inclined side walls 24 along its two opposing longitudinal sides so as to form a large channel. The side walls 24 incline at about 40° to the horizontal, but the angle of inclination could be raised depending on the specific circumstances in which the apparatus is to be used. A vacuum source (not shown for reasons of clarity) is located beneath the drainage plate 23 of the tray 21.

The filter belt 22 passes around the rollers 31 to 37 such that its upper run between respective upstream and downstream rollers 31 and 32 extends through the channel of the tray 21 and its lower run extends beneath the tray 21.

The upstream and downstream rollers 31, 32 are mounted between respective pairs of arms 25, 26, which are pivotally connected, as at 27 and 28, to the main uprights 15, 16. These arms 25, 26 can be pivoted simultaneously between a lower position, shown in solid lines in the drawing, and an upper portion, shown in dot-dash lines at the right hand side of the drawing only, by means of cable connections 29, 30 to common piston and cylinder assemblies 19, mounted vertically at each side of the framework 10. In the lower position, the rollers 31, 32 are substantially in line with the drainage plate 23 of the tray 21 and the upper run of the belt 22 is generally horizontal, although its side edges necessarily curve upwardly as they partially overlie the inclined side walls 24. In the upper position the rollers 31, 32 approach the ends of the uppermost beam 14.

Respective drums 40, 41 of quarter circle cross-section are also pivotally connected to each of the main uprights 15, 16 above the connections 27, 28 of the pivotal arms 25, 26. Each of these drums 40, 41 can be swung between a lower position, shown at the right hand side of the drawing, and an upper position, shown at the left hand side of the drawing by means of respective piston and cylinder assemblies 42, 43 which are mounted horizontally on top of the upper beams 14. In the lower position, the arcuate surface of each drum 40, 41 contacts the filter belt 22 and presses it into contact with the drainage plate 23, whilst, at the same time, one of the flat surfaces of each drum 40, 41 faces inwardly of the tray 21 and provides a substantially vertical end wall thereto. In the upper position, each drum 40, 41 is lifted completely out of contact with the filter belt 22.

After passing over the downstream roller 32, the belt 22 turns downwardly and is guided around the roller 33, which is a driven roller, into the lower run. The belt 22 may subsequently extend through a washing box (not shown) before it continues on around the roller 34 and the roller 35, which is mounted on a bracket 38 upon the beam 12 of the framework 10. A deadweight or tensioning roller 39, which functions to tension the belt 22, is guided in an inclined slot 45 between parallel inclined struts 46, 47 which are attached between the longitudinal beams 11, 12 of the framework 10. After passing beneath and supporting said roller 39, which is capable of dancing or floating up and down in the slot 45, the belt 22 continues on around rollers 36 and 37, back to the upstream roller 31 at the beginning of the upper run.

In use, with the belt 22 stationary, the drums 40, 41 are both pivoted to their lower position and the arms are raised to their upper position so that the upper run of the belt 22 and the flat inwardly direct faces of the drums 40, 41 provide a closed receptacle, with the ends of the upper run stretched upwards around the arcuate portions of the drums 40, 41. The thus formed receptacle is charged with slurry to be filtered by way of any suitable feeding arrangement (not shown) mounted on or above the framework 10. The vacuum source is switched on and when a filter cake has been produced on the belt 22, cake washing can be accomplished by using wash liquor sprays also mounted on or above the framework 10.

Once the filter cake has been fully washed and/or otherwise treated, the vacuum source is switched off, the arms 25, 26 are lowered by actuation of the piston and cylinder assemblies 19 until the rollers 31, 32 are substantially in line with the drainage plate 23 and the drums 40, 41 are raised to their upper position completely out of contact with the belt 22. As the arms 25, 26 are lowered, the roller 39 moves down the slot 45 to take up the slack in the lower run and maintain the tension of the belt 22.

With the drums 40, 41 raised and the arms 25, 26 lowered, the filter cake can be discharged as the driven roller 33 acts to progress the belt 22 in clockwise direction (as shown by the arrows) around the entire apparatus. Cake discharge may be facilitated by provision of a knife or scraper (not shown) impinging on the roller 33.

While the belt 22 is being moved, after the filter cake has been removed therefrom, it travels through the washing box (if provided), where it can be washed with any suitable medium, and it then travels around the rollers 34, 35, 39, 36 and 37. After the belt 22 has moved a complete circuit around the rollers 31 to 37, the piston and cylinder assemblies 19, 42 and 43 are actuated again so that the arms 25, 26 and the drums 40, 41 are swung back to their original positions and the tensioning roller 39 is raised again. The apparatus is then ready to receive a new batch of slurry with a fully washed section of filter belt 22.

It is envisaged that the apparatus will be provided with integrated controls for the slurry feed, the wash liquor feed, the piston and cylinder assemblies 19, 42, 43, the drive roller 33 and the washing box so that automatic operation of these parts will occur at the appropriate time and in the appropriate sequence.

The foregoing is, of course, only illustrative and not limitative of the scope of the invention and many variations are possible. For example, the drums 40, 41 may be replaced by pivotal elements of some other type which similarly act to depress the filter belt into contact with the discharge surface 23 of the tray 21, but can be lifted out of contact with the belt when necessary to permit its progression. It may be possible to work the apparatus with only the element at the downstream end of the upper run being movable in this way, but it is preferable that both elements should move to release the belt for progression. Moreover, with elements of other form problems may arise in that they may tend to become embedded in the filter cake. The upstream and downstream rollers do not necessarily have to be movable upwards and downwards, but this is preferable to facilitate formation of a closed receptacle alternately with permitting smooth progression of the belt.

Furthermore, any of the belt-guiding rollers (31, 32, 34, 35, 36, 37) in the illustrated embodiment (excepting the driven roller 33 and the tensioning roller 39) may be replaced by non-rotatable guide bars, without impairing the function of the apparatus.

I claim:

1. Batch filtration apparatus, comprising:
   (a) a drainage plate disposed substantially horizontally and having a pair of inclined sidewalls disposed along opposing longitudinal sides of said plate;
   (b) vacuum means connected to said drainage plate selectively applying vacuum pressure to said drainage plate to draw liquid downwardly therethrough;
   (c) an endless filter belt having an upper run above and along the length of said drainage plate, and a lower run below said drainage plate;
   (d) means for supporting said endless filter belt in its upper and lower runs;
   (e) means for driving said endless filter belt around said means for supporting when vacuum is not applied to said drainage plate;
   (f) guide means for shaping said endless filter belt in its upper run; and
   (g) means for selectively moving said guide means between a first position in which said belt is driven, and prior to application of vacuum a second position in which said belt in its upper run and inclined sidewalls form a trough-shaped receptacle for a batch of material to be filtered.

2. Apparatus as set forth in claim 1, wherein said means for supporting includes an upstream roller and a downstream roller which define the extent of said filter belt upper run and wherein said guide means comprises means for depressing a portion of said filter belt in its upper run into contact with said drainage plate between said upstream roller and said downstream roller.

3. Apparatus as set forth in claim 2 further comprising means for moving said means for depressing out of contact with said filter belt when filtration is complete to facilitate movement of said belt.

4. Apparatus as set forth in claim 2 wherein said means for depressing comprises two drums of part-circular cross-section, one said drum at each end of said upper run, and means for pivoting each said drum between a lower position in contact with said filter belt where each said drum provides a substantially vertical end wall of said receptacle, and an upper position out of contact with said filter belt.

5. Apparatus as set forth in claim 4, wherein a framework is provided for mounting said means for supporting, and said means for pivoting includes a piston and cylinder arrangement attached to said framework.

6. Apparatus as set forth in claim 2 wherein said guide means also comprises means for raising and lowering said upstream and downstream rollers.

7. Apparatus as set forth in claim 6 wherein said upstream and downstream rollers are each mounted on a respective pivotal member including means for swinging said member downwardly to a position where said rollers are substantially in line with said drainage plate.

8. Apparatus as set forth in claim 7 wherein a framework is provided for mounting said means for supporting, and said means for swinging includes a piston and cylinder arrangement attached to said framework.

9. Batch filtration apparatus as set forth in claim 1, wherein said means for supporting comprises roller means.

10. Batch filtration apparatus as set forth in claim 1, wherein said means for supporting comprises non-rotatable bars.

11. Apparatus as set forth in claim 10 wherein said means for supporting includes an upstream bar and a downstream bar defining the extent of said upper run and wherein said guide means comprises means for depressing said upper run into contact with said plate between said upstream and downstream bars and means for raising said upstream and downstream bars when said endless belt in its upper run is depressed and vacuum is applied to said plate, and means for lowering said upstream and downstream bars when vacuum is no longer applied to said plate and said endless belt in its upper run is released to permit progression of said filter belt.

* * * * *